United States Patent [19]

Christopher

[11] 4,107,282

[45] Aug. 15, 1978

[54] ACETYLIDE CATALYST AND PROCESS OF PRODUCING HYDROGEN

[76] Inventor: Van Michaels Christopher, 1817½ N. Las Palmas Ave., Hollywood, Calif. 90028

[21] Appl. No.: 735,110

[22] Filed: Oct. 22, 1976

Related U.S. Application Data

[63] Continuation-in-part of Ser. No. 445,792, Feb. 25, 1974, abandoned, and Ser. No. 552,802, Feb. 24, 1975, abandoned.

[51] Int. Cl.² .......................... B01J 37/28; C01B 1/08
[52] U.S. Cl. ........................................ 423/657; 48/59; 48/60; 260/665 R; 252/471; 252/423
[58] Field of Search ................ 48/59, 60; 260/665 R; 423/658, 656, 657; 252/471, 423

[56] References Cited

U.S. PATENT DOCUMENTS

| | | | |
|---|---|---|---|
| 800,380 | 9/1905 | Machalske | 423/646 |
| 1,109,448 | 9/1914 | Messerschmitt | 252/471 X |
| 1,889,714 | 11/1932 | Urbain | 423/657 |
| 1,937,488 | 11/1933 | Jenness | 252/471 X |
| 2,082,134 | 6/1937 | Alexander | 423/647 |
| 2,103,219 | 12/1937 | Jenness | 252/471 X |
| 2,449,635 | 9/1948 | Barr | 423/658 |
| 2,504,927 | 4/1950 | Hansley | 423/646 |
| 2,665,199 | 1/1954 | Martin et al. | 423/657 X |
| 3,031,287 | 4/1962 | Benson et al. | 423/657 X |
| 3,590,008 | 6/1971 | Hansley et al. | 260/665 R X |
| 3,771,259 | 11/1973 | Portz et al. | 48/60 |

FOREIGN PATENT DOCUMENTS 401 of 1911 United Kingdom ..................... 423/658

*Primary Examiner*—Allen B. Curtis

[57] ABSTRACT

The present invention relates to the manufacturing of novel hydrogenating fuel alloys evolving liquid and gaseous hydrocarbons when submitted to atmospheric or pressured hydrolysis. Said fuel alloys produce quality engine fuel and are an important and inexpensive new source of energy.

4 Claims, No Drawings

ACETYLIDE CATALYST AND PROCESS OF PRODUCING HYDROGEN

This invention is a continuation-in-part of U.S. application, Ser. No. 445,732 filed on Feb. 25, 1974 and Ser. No. 552,802 filed on Feb. 24, 1975, both now abandoned.

The main object of the invention is to prepare novel hydrogenating fuel alloys which in contact with water liberate liquid and gaseous hydrocarbons suitable as engine fuels and which at high temperature and pressured hydrolysis hydrogenate the carbon contained inside the same alloys into additional liquid hydrocarbons.

An advantage of the claimed alloys is the possibility to use all kinds of carbonaceous materials in the manufacturing process producing the alloys including cellulose from agricultural wastes, wastes from petroleum refineries (asphalt and others) and low calorie lignite coal.

A second advantage of the claimed process is that the necessary hydrogen is obtained unexpensively through a novel low temperature thermal splitting of the water. The same hydrogen can be used for synthesis of alcohols.

The third advantage of the above fuel alloys is that in hermetically closed chemical reactors, they can produce pressure as high as 200 to 300 atmospheres during their hydrolysis which, when heated at 300° C to 500° C, can be increased even more and hydrogenate the carbon constituent of the alloy thus producing additional predominately liquid hydrocarbons which help to reduce the cost and increase the yield.

Other objects and advantages of the invention will be apparent to those skilled in the art upon reading the specification. My fuel alloys are based on the following general ideas:

As my experience showed, most hydrides dilute very fast in almost all metal hydrocarbonides (acetylides, methanides, ethylenides, etc. known under the common name carbides) at temperature of only a few hundred centigrade (celsius) degrees. On the other hand I've found that quenched Iron hydrocarbonides when alloyed with high percentage of $MnC_3$ quickly hydrolyze and that the hydrolysis of same hydrocarbonide alloys evolve non-acetylene containing hydrocarbons. That is because the hydrogen evolved by the alloyed hydrides and $MnC_3$ hydrogenate the acetylene to other hydrocarbons. The latest is an important advantage because both acetylene and hydrogen are unsuitable for motor fuels for they are highly detonative with a low octane number and because the hydrogen attacks the metal part of the engine forming along with them very brittle metal hydrides. Furthermore, at elevated temperature (during the combustion) the $C_2H_2$ decomposes to C and H causing considerable scaling.

The liquid hydrocarbons obtained through my fuel alloys are predominately light and for many purposes they do not need additional refining except a simple separation of the liquid phase from the gaseous phase, thus saving enormous investments from avoiding the need of expensive oil refineries.

When more hydrocarbons are needed they can also be obtained without expensive refinery simply by adding more carbon to the above hydride, hydrocarbonide and carbon containing fuel alloys and submit them to high pressure and high temperature hydrolysis or acidolysis (acid hydrolysis) instead of hydrolysis or hydrolysis at room temperature and atmospheric pressure. This hydrogenates the carbon into light liquid hydrocarbons which can be heavier if Molybenium oxide is used as a catalyst instead of chromium oxide.

The preparation of the proposed hydrocarbide-hydride carbon-catalyst fuel alloys can be obtained as follows:

Initially, through incomplete burning of carbonaceous material of any kind carbon monoxide is obtained. The obtained CO is mixed with hydrogen and nascent hydrogen at a temperature of 250° C to 400° C and in the presence of nickel catalyst it is converted to a mixture methane with small amounts of hydrogen and CO. The obtained mixture is further mixed with vapours of alkali or alkali earth metals and the temperature is increased from 900° C to 1900° C. Then the hot mixture passes through a halogen salt as another catalyst. The above is a catalytic pyrolysis converting partially the methane into acetylene. Because the acetylene is unstable at the above temperatures, it is rapidly cooled down to 600° C to 550° C to prevent it from thermal decomposition.

Once having the relatively cool methane - acetylene - hydrogen - CO mixture it is directed to a chemical reactor containing liquid alkali or powdered alkali-earth metals (under their melting point). In that reactor the obtained methane - acetylene - hydrogen CO mixture attacks said metals at temperature of 450° C to 500° C and produces an acetylide-hydride alloy with traces of carbonyls as a result of the trace quantities of CO. However at this stage, the hydrides dissolved into the alloy are not sufficient because the hydrogen in the above gaseous mixture is insufficient and mainly because the temperature range of 450° C to 500° C while very favourable for acetylide formation is unfavourable in obtaining hydrides. To prepare the proper fuel alloy, the above obtained low quality fuel alloy is again cooled down to 350° C mixed with additional alkali metals, nascent hydrogen, powdered carbon (low on sulfur) and hydrogenation catalysts to increase the hydride content of the alloy and to improve its hydrogenation property. The role of this catalyst is not to facilitate the formation of hydride, but to use it later during the hydrolysis of the alloy to facilitate the hydrogenation of the acetylene and carbon into other no acetylene containing liquid and gaseous hydrocarbons. When such alloy is submitted to atmospheric pressure hydrolysis and at room temperature it evolves methane mixed with small amounts of other light hydrocarbons (mainly ethylene) and not acetylene or hydrogen. When the same fuel alloy is submitted to high pressure hot hydrolysis attaining 250 to 350 atmospheres and 300° C to 550° C the hydrogenation affects mainly the carbon contained in the alloy. The obtained hydrocarbons are predominately liquid. The needed high pressure is self-generated and is obtained by heating during the hydrolysis process of the hermetically sealed hydrogenation reactor. To obtain lighter liquid hydrocarbon fraction, the temperature must be above 500° C and the hydrogenation catalyst alloyed in the fuel alloy must be chromium oxide. For heavier hydrocarbon fractions, the temperature must be below 500° C and the catalyst must be Molibdenium oxide. While for medium weight liquid hydrocarbons on can use a mixture of both. Iron group catalyst such as nickel and cobalt can also be used but only at atmospheric pressure hydrolysis to obtain predominately gaseous hydrocarbons because these catalysts do not stimulate the hydrogenation of the contained carbon.

During my research and experiments, I found that superior fuel alloys, evolving liquid hydrocarbons at atmospheric pressure, can be produced with quenched iron-manganese hydrocarbonides containing or not containing uranium sesquicarbide $U_2C_3$. They can be obtained as follows: Initially into the same chemical reactor a powdered mixture of manganese and iron oxides, hydroxides, halides, and coal, or other carbonaceous materials, such as charcoal, oil refining wastes is poured. Because the halides are self-catalysing the synthesis of metal hydrocarbonides the iron and manganese halides are the preferred feed stock, and the preferred iron halide is the iron (III) chloride ($FeCl_3$) because it sublimates and volatilizes only at 300° C and boils at about 310° C which converts the $FeCl_3$ into very active hot halide steam facilitating and accelerating enormously the synthesis reaction. Iron (II) chloride $FeCl_2$ is also suitable because when heated it converts to iron (III) chloride + iron (III)oxide.

The manganese as well as the uranium sesquicarbide constituents of the fuel alloy are needed to lower the hydrolysis temperature down to boiling and even to room temperatures. They also speed up the hydrolysis rate of the iron hydrocarbonide enormously which otherwise is slow and difficult. Consequently the manganese and the uranium act as a new kind of "Hydrolysis Catalyst". In this respect manganese is more important than uranium. However manganese tends to produce too much gaseous hydrocarbons and is more suitable for fuel alloys destined to high self-pressured hydrogenating hydrolysis as above described. Pure uranium sesquicarbide is good for atmospheric pressure hydrolysis. However it is expensive regardless of its recyclibility. Manganese and iron are also recyclable. Another advantage of alloying manganese and uranium hydrocarbonides together with the iron hydrocarbonide is to avoid strong acids during the hydrolysis. Pure iron hydrocarbonides can be hydrolyzed only with strong boiling acids when it is alloyed with manganese and uranium hydrocarbonides (or only with manganese hydrocarbonides) the hydrolysis may occure even at room temperature and even with pure water. The needed uranium sesquicarbide is synthetised separately for reasons that will become clear later.

The above powdered feed stock moisture is fluidised and heated by passing through the bottom of the reactor limited quantities of air to cause fluidising and CO gas. When the temperature inside the reactor attains 600° C to 1000° C the CO attacks the feed stock at atmospheric pressure and starts converting it catalyticly into hydrocarbonides. At the above temperatures te $FeCl_3$ is entirely converted to very hot catalysing halid steam which catalyzes also the powdered oxides reducing them and converting them and the $FeCl_3$ to mutually alloyed hydrocarbonides. The reaction is very fast because it occurs in a gaseous and fluidised state and can be additionally speeded up if some hydrogen and inert $CO_2$ gases are introduced to lower the partial pressure of CO below the atmospheric pressure. When the above mixed hydrocarbonide synthesis is completed the obtained powdered hydocarbonide alloy is quickly passed into a cooling oil bed to be quenched at room temperature. The reason for the quenching process is this: As my experience has shown, the best yields of hydrocarbons during the hydrolysis are obtained when thhe iron hydrocarbonide consist entirely of cementite $Fe_3C$, known as $\delta$ phase of the Iron Carbide and $Mn_3C$ (manganese trita carbide). The cementite, however, cannot be obtained directly especially at the above prohibitive temperatures. In the temperature range of 600° C to 1000° C a great deal of other hydrocarbonides are formed but none of them is cementite. At the above conditions the iron hydrocarbonide fraction consists mainly of $Fe_2C$ and $Fe_4C$.

At a temperature higher than 420° C, the obtained $Fe_2C$ is always the $\kappa$ phase of the iron hydrocarbonide known as Hagg carbide and more accurately described $Fe_{20}C_9$. Below 420° C the Hagg carbide begins a fairly slow self conversion into its stable hexagonal phase known as $\epsilon$ phase of the Iron carbide and that self-conversion continues down to 290° C. However in the temperature range of 290° C to 380° C it is very slow. The needed $\delta$ phase (the cementite) for the above fuel alloy is obtained only if the temperature is rapidly lowered down to 55° C or less. This is another self-conversion, however, it needs very fast temperature lowering for otherwise the obtained hydrocarbonides convert themselves not into cementite but into the stable $\epsilon$ phase and other carbides which during the hydrolysis or during further slow cooling do not convert themselves into hydrocarbons but into the original metals and graphite which significantly reduces the yield of the evolved liquid and gaseous hydrocarbons. This is why the quenching must not proceed in slow cooling air. It can proceed however in water if storage of the hydrocarbonide powder is not intended. In such a case the quenching process is unified with the hydrolysis, and if it is intended to add uranium sesquicarbide to the fuel alloy it must be done at temperatures above 420° C by the very end of the synthesis. Stored unquenched fuel alloy must be preheated at above 420° C and then quenched before hydrolyses otherwise the yield will be low.

In addition of the above, it must be kept in mind that quenching is best obtained in oil not in water because when done in water a part (some time a large part) of the iron hydrocarbonide in the alloy is hydrolised before being converted to cementite which reduces the yield. However as the hydrolysis of the obtained powdered hydrocarbonide alloy hydrolyses in cold water only when the alloy contains more than 75% $Mn_3C$, quenching in non acidic cold water is possible and practical when the $Mn_3C$ is below 75%.

For a good yield and to proceed faster, the hydrolysis must be acidic and hot (hot acidolysis) when the content of the $Mn_3C$ (into the fuel alloy) is between 50% and 80% which is best obtained with boiling dilluted (or very dilluted) hydrochloric acid.

When the $Mn_3C$ is 90% or more, the hydrolysis of the alloy is sufficiently fast in pure hot water. When the $Mn_3C$ is lowered down to 20% or less, good yield and good rate of the hydrolysis is possible only in boiling concentrated acids deteriorating the factory equipment. ($Fe_3C$ is resistant to cold concentrated acids).

If to a fuel alloy containing up to 85% $Mn_3C$ 3% to 5% Si is added as inhibitor to the cold water hydrolysis, then it can be quenched in cold water. Repeated quenching increases the yield of the obtained cementite. Non-corrosive small amounts of hydrochloric acid during the hydrolysis are always desirable because in the mean time they are recycling the iron halide which is a must as a catalyst for the hydrocarbonide synthesis. The hydrogenation catalysts are the same as these described above and their purpose is to hydrogenate the carbon constituent of the alloy into additional hydrocarbons during the high self-pressured hydrolysis. The needed carbon in the alloy is obtained through the unburned carbon powder during the synthesis process. The hydrolysis of the obtained quenched fuel alloys readily evolves gaseous and liquid hydrocarbons and in the mean time recycles the hydrocarbonides into the starting halides and hydroxides.

To reduce the gaseous and the hydrogen constituents of the evolved hydrocarbons and make them competitive at atmospheric pressure hydrolysis, the obtained hydrocarbon fuel alloys must be mixed with uranium sesquicarbide $U_2C_3$ which evolves better yields and serves as catalyst for obtaining better yields from the other constituent of the fuel alloy.

To obtain uranium sesquicarbide $U_2C_3$ liquid or powdered uranium must be mixed and alloyed with excess carbon black (or other kind powdered pure carbons) containing small amounts of halides as catalyst. The needed excess carbon must be 70% or more by atoms and the temperature range must be between 1000° C and 1500° C. In these conditions only an amount of 7 to 12% (by weight) of the carbon reacts with the metal uranium and forms pure $U_2C_3$ alloyed with part of the remained carbon into a powdered uranium sesquicarbide - carbon fuel alloy which is then mixed and alloyed with the above described Iron-Manganese fuel alloy. If the above synthesis conditions are not respected the yield of $U_2C_3$ is very low and may be entirely replaced by UC and $UC_2$ which while being carbides are not hydrocarbonides because do not evolve any hydrocarbons being in fact only refractive carbides (as the boron and many other carbides).

Because the $U_2C_3$ is expensive it is economical only when it is mixed up to 10% no matter that the uranium is recycled and that 100% $U_2C_3$ fuel alloy is a good alloy. 100% $U_2C_3$ however can be successfully used to build petrol producing nuclear reactors or gasoline reactors. The obtained "Iron-Manganese-Uranium-Carbon-catalyst" fuel alloy can also contain hydride constituent when its main purpose is to be used in hot high pressure hydrolysis as above described. The final step in the preparation of the fuel alloy as described above is the dopping with neutral surfactant or other neutral substances to prevent the alloy from oxidation on air and moisture. The hydrogen needed for the above fuel alloy manufacturing is very inexpensively produced in nascent (plasma) state from my novel low temperature thermal splitting of water. As it is known water splits thermally at 2000° C or more. I've found however that water can be split at much lower temperatures using an alternating oxidation - reducing process of the manganese oxide $Mn_2O_3$. The new process consists of oxidation of $Mn_2O_3$ to $MnO_2$ with water steam in the abcence of air at temperatures below 530° C preferably in the temperature range of 250° C to 450° C. Said oxidation splits the $H_2O$ molecules and liberates nascent (plasma) hydrogen. When all manganese oxide is converted to $MnO_2$ the hot vapor stream is cut off and the temperature is increased to 530° C or more.

The higher temperature pyrolyse the $MnO_2$ reducing it back to $Mn_2O_3$ ready to start a new cycle of splitting oxidation. During the pyrolytic reduction is liberated $O_2$ which is a valuable by-product, thus helping to reduce further the price of the needed plasma (nascent) hydrogen.

What I claim is:

1. A species of hydrogenating fuel alloys evolving liquid and gaseous hydrocarbons when submitted to recycling hydrolysis and acidolysis which can be done both at room temperature and atmospheric pressure and at high pressure controlled in the range of 250 to 400 atmospheres to profit the fuel alloys' hydrogenating property said alloys being based on alloying hydrocarbonides with hydrides cobalt, nickel, chromium oxide and molybdenum oxide as catalysts and with powdered carbon comprising the following steps:

(a) incomplete burning of carbonaceous materials to produce carbon monoxide, reacting said carbon monoxide with hydrogen plasma from Nascent Hydrogen in the presence of to nickel catalyst at a temperature of 250° C to 400° C to form methane then mixing said methane with vapour of alkali or alkali-earth metal and heating said mixture at a temperature of 900° C to 1200° C in the presence of halogen catalyst salt to partially pyrolyse the methane thereby producing acetylene containing unreacted methane, hydrogen and CO, rapidly cooling said mixture to 550° C to 600° C to prevent partial thermal decomposion of said acetylene, then contacting the so cooled gaseous mixture with liquid alkali or fluidised alkali-earth metal at a temperature of 450° C to 600° C to produce an alkali or alkali-earth metal acetylide, naturally alloyed with small amounts of same metal's hydrides, then cooling said acetylide to about 350° C to 400° C, mixing them with additional liquid alkali metal, nascent hydrogen with the above defined hydrogenating catalyst and with powdered carbon to produce an acetylide-hydride-catalystcarbon fuel alloy evolving methane and other hydrcarbons but no acetylene when submitted to hydrolysis or acidolysis during which hydrolysis the liberated nascent hydrogen helped by the catalyst attacks the liberated acetylene and hydrogenate it immediatly to methane and other hydrocarbons, said nascent hydrogen hydrogenating predominantly the carbon constituent of the fuel alloy and producing predominantly liquid hydrocarbons when the acidolysis is conducted at the above stated high self-pressures high temperature where the catalyst is chromium oxide, molybdenum oxide or a mixture of both alloyed together with the other constituent of the recyclable alloy;

(b) incomplete burning of carbonaceous materials to produce carbon monoxide then passing said carbon monoxide through the bottom of a fluidising bed containing powdered mixture of carbon, iron, halides, oxides and hydroxides, manganese halides oxides and hydroxides to react with them under their melting points at 600° C to 1,000° C in the presence of $CO_2$ and hydrogen to lower the partial pressure of CO thus to evaporate the halides, self catalysts and thus to produce a powdered iron hydrocarbonide - manganese hydrocarbonide $M_3C$ - carbon fuel alloy dopped with chromium and molybdenum oxides as hydrogenating catalysts which alloy is then passed into an oil quenching bed to rapidly quench the fuel alloy down to 55° C or lower which converts the different iron hydrocarbonide constituents to cementite hydrocarbonide $Fe_3C$ permitting better yield of liquid hydrocarbons which hydrocarbons are liberated: during a recycling the feed stock cold hydrolysis when the manganese hydrocarbonide $Mn_3C$ is more then 85%; during boiling hydrolysis when the $Mn_3\overset{.}{C}$ is from 60 to 80%; during boiling acidolysis when the $Mn_3C$ is below 60% said liquid hydrocarbons being evolved in significantly increasing yield when the fuel alloy is submitted to the above stated high self pressure and high temperature hydrogenating acid hydrolysis which yield is again increased when to the fuel alloy is added 5% to 10% uranium sesquicarbide $U_2C_3$ which must be produced separately from powdered mixture of uranium hydroxide, oxides, halides and excess carbon of up to 70% and more by atoms again with carbon monoxide in the presence of $CO_2$ and hydrogen heated at 1000° C to 1500° C where the excess carbon and the above specific temperature range serve to suppress the formation of other uranium carbides which differ from $U_2C_3$ are refractive and not evolving hydrocarbons; and (c) a final mixing of alloys (a) with alloys (b) for further better yield and doping the mixture with neutral surfactant or other neutral substance to prevent the alloy from oxidation with moist air during storage.

2. The process of manufacturing nascent hydrogen H+ concurrently with oxygen of claim 1 from water without burden products or reducing substances not possible with any existing process said manufacturing employing my original process of manganese low temperature thermal splitting of the water possible only through the use of manganese oxides based specifically on the unique property of the manganese dioxide $MnO_2$ for pyrolytic self reduction to $Mn_2O_3$ at over 530° C and to $Mn_3O_4$ at over 940° C combined with the reverse property of the obtained $Mn_2O_3$ for back self oxidation to $MnO_2$ below 530° C in the presence of air or steam comprising the steps:

(a) introducing into a reactor powdered $MnO_2$ feed stock then submitting it to thermal self reduction through pyrolysis only at over 530° C and pressure of 1 to 100 atmospheres liberating an abundance of $O_2$ avoiding all the while any burden products catalysts or reducing substances, a must for the classic process producing $H_2$, my process following the technique:

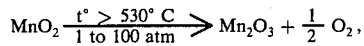

(b) evacuation of the obtained oxygen and fluidizing the obtained $Mn_2O_3$ with hot steam which reduces the steam to nascent hydrogen ions H+ conducted in the abscence of air at 1 to 100 atmospheres of pressure and temperature below 530° C but not below 100° C which splits the $H_2O$ into 2H+ and O− oxidising the $Mn_2O_3$ back to $MnO_2$ ready to be used for a new pyrolysis cycle again without burden products or reducing substances as follows:

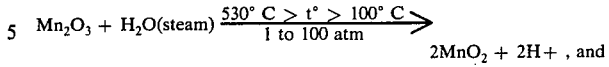

(c) continuous alternation of step (a) with step (b) during which the obtained H+ and O, are used immediately for the purpose of claim 1 in order to prevent the recombination of the H+ into molecular $H_2$ combined with using the hydrogen in its molecular state for other purposes.

3. The hydrogenating fuel alloys produced through incomplete burning of carbonaceous materials to produce carbon monoxide, reacting said carbon monoxide with hydrogen plasma (nascent hydrogen) in the presence of nickel catalyst at a temperature of 250° C to 400° C to form methane then mixing said methane with vapour of alkali or alkali-earth metal and heating said mixture at a temperature of 900° C to 1200° C in the presence of halogen catalyst salt to partially pyrolyze the methane thereby producing acetylene containing unreacted methane, hydrogen and CO, rapidly cooling said mixture to 550° C to 600° C to prevent partial thermal decomposition of said acetylene then contacting the so cooled gaseous mixture with liquid alkali or fluidized alkali-earth metal at a temperature of 450° C to 600° C to produce an alkali or alkali-earth metal acetylide, naturally alloyed with small amounts of the same metal's hydrides then cooling said acetylide to about 350° C to 400° C mixing them with additional liquid alkali metal, nascent hydrogen (hydrogen plasma) with the above defined hydrogenation catalyst and with powdered carbon to produce an acetylide hydride-catalyst-carbon fuel alloy evolving methane and other hydrocarbons but no acetylene in hydrolysis.

4. The hydrogenating fuel alloy produced through incomplete burning of carbonaceous materials to produce carbon monoxide then passing said carbon monoxide through the bottom of a fluidizing bed containing powdered mixture of carbon, iron, halides, oxides and hydroxides, manganese halides, oxides hydroxides to react with them below their melting points at 600° C to 1,000° C in the presence of $CO_2$ and hydrogen to lower the partial pressure of CO thus to evaporate the halide self catalyst and catalyst thus to produce a powdered iron hydrocarbonide-manganese hydrocarbonide ($M_3C$) carbon fuel alloy doped with molybdenium oxides as hydrogenerating catalysts which alloy is then passed into an oil quenching bed to rapidly quench the fuel alloy down to 55° C or lower which converts the different iron hydrocarbonides to cementite hydrocarbonid $Fe_3C$ allowing better yield of hydrocarbons during hydrolysis and during the hydrogenation of the contained carbon within the same fuel alloy.

* * * * *